March 2, 1926. 1,575,462
W. STUEBING, JR
PLATFORM
Filed Oct. 18, 1920
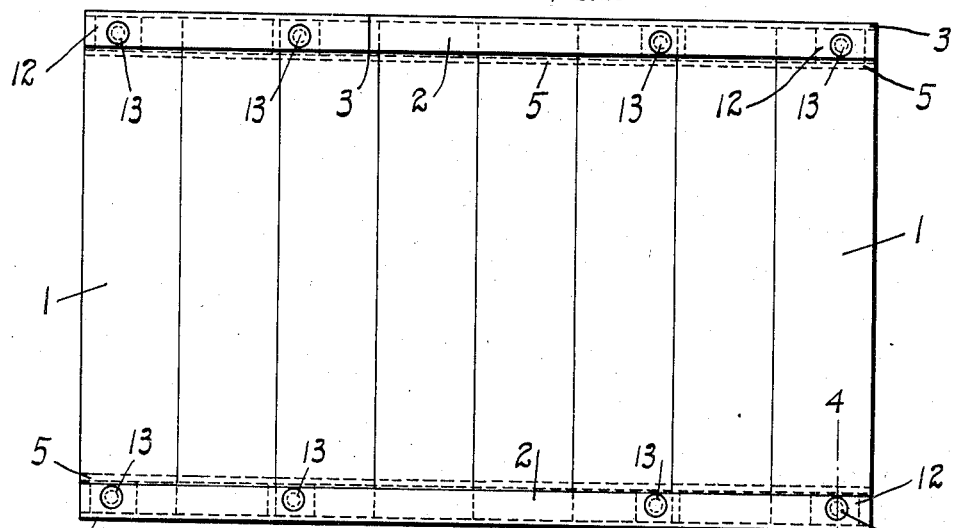
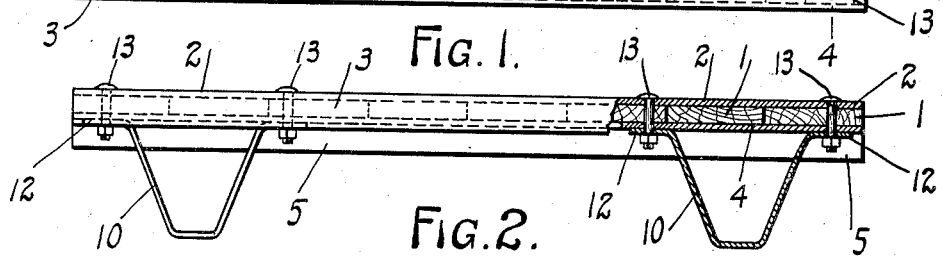
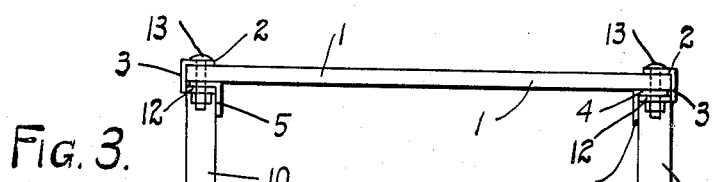
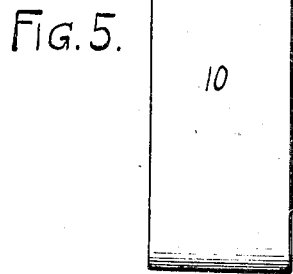
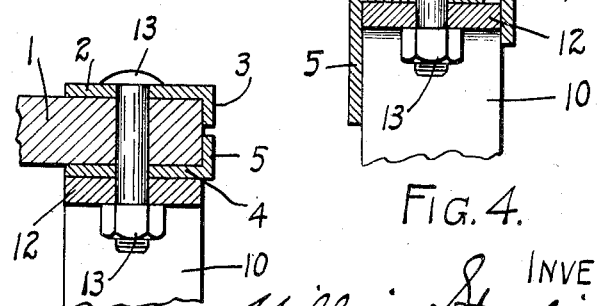
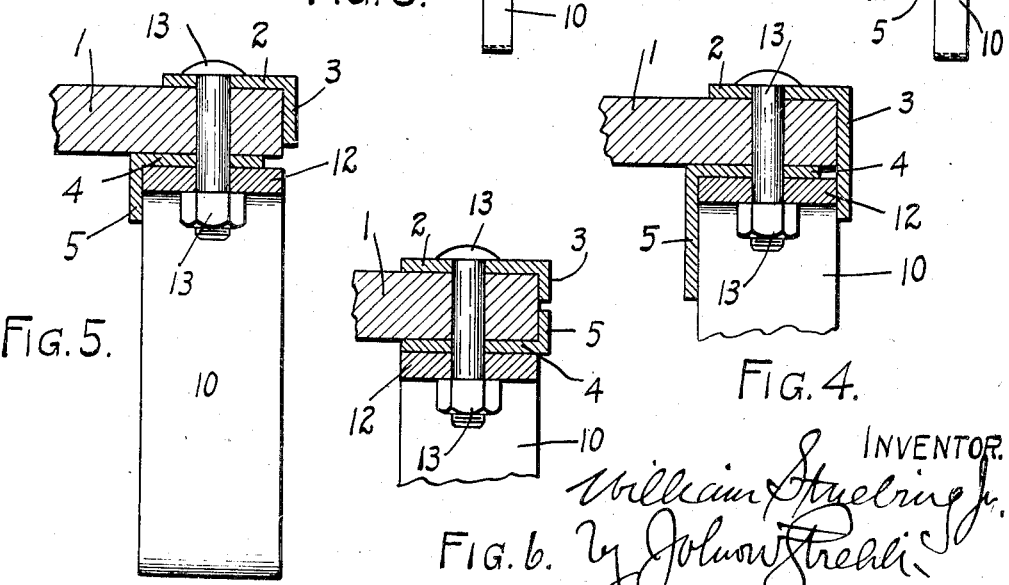

Patented Mar. 2, 1926.

1,575,462

UNITED STATES PATENT OFFICE.

WILLIAM STUEBING, JR., OF CINCINNATI, OHIO.

PLATFORM.

Application filed October 18, 1920. Serial No. 417,734.

*To all whom it may concern:*

Be it known that I, WILLIAM STUEBING, Jr., a citizen of the United States, residing at the city of Cincinnati, in the county of Hamilton and State of Ohio, have invented certain new and useful Improvements in Platforms, of which the following is a specification.

The present invention relates to portable skids or platforms used for supporting various articles for transportation on lifting trucks.

In manufacturing plants it has become common practice to load raw materials, partly finished or completed work and other articles on portable skids which with their load are transported by lifting trucks to and from storage rooms and elsewhere about the plant according to the requirements of production, shipment, etc. To transport a load, the lifting truck is run under the skid and manipulated to raise the skid with the load thereon. After transportation to the desired place, the skid with its load is lowered to the floor, the lifting truck then being free for use on another load.

Such a practice reduces to a minimum the work of loading and unloading and makes it possible to maintain the transporting trucks in substantially continuous operation since there are no delays necessitated by the loading and unloading operations.

The lifting trucks are usually made entirely of steel and they are very strong. The capacity of the trucks in use, therefore, depends upon the capacity and durability of the skids which sustain the loads to be carried.

The skids are generally made wider and longer than the frame or elevating platform of the lifting truck on which they are to be carried. Therefore that part of the load which rests on the end of the skid extending beyond the rear end of the truck is supported merely by the rigidity of the skid itself.

Skids which have been in common use for many years have been made entirely of wood and have consisted of side runners and a floor consisting of boards nailed or bolted to the side runners. When such skids are heavily loaded the stresses due to the overhanging load and the torsional and other stresses consequent upon handling loosen the nails, screws or bolts, and the skid soon becomes racked and broken requiring frequent repairs. Skids made entirely of metal are expensive and are ordinarily too heavy and cumbersome for general use.

The present invention in its preferred form provides a skid having a floor of wood but in which the rigidity of the floor is increased by angle irons, or bars, which protect the ends of the boards and which are so constructed and arranged as to provide a truss-like arrangement of sufficient rigidity to support any loads to which the skid is to be subjected.

Referring to the accompanying drawings of a particular illustrative embodiment of the invention, Figure 1, is a plan view, Figure 2, is a side view, one end being shown in section to illustrate the construction, Figure 3, is an end view, Figure 4, is a section on the line 4—4, Figure 5, is a section on the same line as Figure 4, but showing a different embodiment of the invention, and Figure 6, is a sectional view on the same line as Figure 4, but showing a further embodiment of the invention.

The skid to be more particularly described for the purpose of illustrating the invention has a floor comprising parallel transverse floor members which are secured together and held in rigid relation by side frames made up of structural iron extending longitudinally along the two sides of the skid. The side frames distribute the unbalanced stresses and carry the stresses due to the load to the points of support both when the skid is supported on a lifting truck and when it is resting on its own legs. The floor members receive the load and connect the side frames.

As shown in Figure 1, the floor boards 1 extend transversely of the skid and are bound together at their ends between longitudinally extending upper and lower angle bars. The angle bars at each side of the skid are connected to each other to form what, for convenience of description, will be called a truss. Each upper angle bar has a horizontal flange 2 which overlies and engages the tops of the boards and a depending vertical flange 3 which serves as a stiffening element and which overlies and protects the ends of the boards. Each lower angle bar has a horizontal flange 4 which engages the lower sides of the boards and a depending vertical flange 5 which serves as a stiffening element and as a guide for the lifting truck as it is run beneath the skid. Some of the boards 1 are relatively wide and because they are clamped at both ends by the trusses, serve to resist torsional stress upon the skid.

Suitable legs 10 are rigidly connected to the side frames or trusses by being secured to and against the lower angle bars. Each leg is formed of bar iron bent to provide a flat, relatively smooth floor-engaging bottom and end portions 12, 12 which engage and are secured to a lower angle bar. As best shown in Figure 4 the vertical flange 3 of the upper angle bar extends a substantial distance below the lower face of the floor and the leg 10 is positioned between this flange and the depending flange 5 of the lower angle bar. This arrangement is such as to provide a pocket or channel between the two depending flanges in which the end portions 12 of the legs are received. The end portions 12 of the legs are thus engaged by and clamped between these depending vertical flanges of the angle bars and they are held in position by bolts 13 which preferably also serve to clamp the upper and lower angle bars together with the floor boards therebetween.

These angle bars may have bolt holes punched similarly and may be complete duplicates of each other so that, regardless of the number or the width of the floor boards, all angle bars for skids of a particular size, as carried in stock, may be similar, this for the reason that, with such a construction as above described it is not necessary to have each floor board pierced by a bolt 13.

In the embodiment shown in Figure 5 the depending flanges 3 and 5 are narrower, but the arrangement is otherwise similar to that shown in Figure 4 and the legs are located between the planes of the downwardly extending flanges as in Figure 4.

In the embodiment shown in Figure 6 the flanges 3 and 5 are still narrower and they are turned toward each other to cooperate in protecting the ends of the boards. These flanges, however, have the same function of stiffening the horizontal flanges.

The particular arrangements shown in which the truss members are of metal, are positioned in the same vertical plane and are connected directly by one set of bolts, is preferred because of the economy of manufacture, but it will be understood that variations in the arrangement, in the shape, and in the materials of construction, may be made without departing from the spirit of the invention as defined in the claims.

What I claim as new and my invention and desire to secure by Letters Patent is:

1. In a platform of the character described, a floor made up of a multiplicity of parts, an upper and a lower angle iron strip at each side edge of said floor, said parts forming said floor lying transversely to said angle iron strips, the lower flanges of said angle iron strips extending downwardly, feet supports for said platform floor, the central portions of the width of the upper ends of said feet supports located between the planes of said downwardly extending angle iron flanges, and means for connecting together said feet, angle irons and parts forming the floor, at each end of said platform floor.

2. A portable skid, for use with a lifting truck, comprising a rigid floor made up of a number of transversely extending floor members and longitudinally extending upper and lower angle bars at each side of the floor and secured to the floor members, said upper and lower angle bars being separate from each other and adjustable toward each other in assembling the skid to accommodate the thickness of the floor members, each upper angle bar having a horizontal flange bearing against the tops of the floor members arranged to receive the upward pressure of the lifting truck on the floor members and a vertical flange overlying and protecting the ends of the floor members arranged to stiffen the horizontal flange to sustain the stresses thereon and each lower angle bar having a horizontal flange bearing against the under sides of the floor members and a depending vertical flange arranged to stiffen the horizontal flange to sustain the stresses thereon, and legs secured to the lower angle bars.

3. A portable skid, for use with a lifting truck, comprising a rigid floor made up of a number of transversely extending floor members and longitudinally extending upper and lower angle bars at each side of the floor secured to the ends of the floor members and to each other to form trusses, each upper angle bar having a horizontal flange bearing against the tops of the floor members arranged to receive and sustain the upward pressure of the lifting truck on the floor members and a vertical flange overlying and protecting the ends of the floor members arranged to stiffen the horizontal flange to sustain the stresses thereon, and each lower angle bar having a horizontal flange bearing against the under sides of the floor members and a depending vertical flange arranged to stiffen the horizontal flange to sustain the stresses thereon, and legs secured to the lower angle bars, the depending flanges of the lower angle bars lying inside of the legs and providing guides for a lifting truck introduced beneath the skid to protect the legs and to determine the position of the lifting truck relative to the skid and its load.

4. A portable skid, for use with a lifting truck, comprising a rigid floor made up of a number of transversely extending floor members and longitudinally extending upper and lower angle bars at each side of the floor secured to the ends of the floor members and to each other to form trusses, each upper angle bar having a horizontal flange bearing against the tops of the floor members arranged to receive and sustain the upward pressure of the lifting truck on the floor members and a vertical flange overlying and protecting the ends of the floor members and extending below the lower face of the floor arranged to stiffen the horizontal flange to sustain the stresses thereon, and each lower angle bar having a horizontal flange bearing against the under sides of the floor members and a vertical flange depending from the inner edge of the horizontal flange and arranged to stiffen the latter to sustain the stresses thereon and legs secured to the horizontal flanges of the lower angle bars, the vertical flanges of the upper and lower angle bars bearing against the opposite sides of the legs.

5. A portable skid, for use with a lifting truck, comprising a rigid floor and spaced legs, said floor comprising a number of transversely extending boards and longitudinally extending angle bars at both sides of the skid running along the under sides of the boards, each angle bar having a horizontal flange engaging the boards and secured thereto and a vertical flange arranged to stiffen the horizontal flange, the legs being secured to the angle bars, the vertical flanges of the angle bars lying between the legs and serving as guides for the lifting truck to protect the legs when the lifting truck is introduced beneath the skid.

6. A portable skid, for use with a lifting truck, consisting of a number of transverse boards, longitudinally extending trusses connecting the ends of the boards to bind the same together to form a rigid floor and to distribute the stresses of the load and of the support, and legs connected to the trusses, each truss comprising upper and lower longitudinal members, the lower member being shaped and arranged to form a guide for a lifting truck introduced beneath the skid thereby to protect the legs from engagement by the truck.

7. A portable skid, for use with a lifting truck, comprising a rigid floor made up of a number of transversely extending floor members and longitudinally extending side members at each side of the floor secured to the ends of the floor members, each side member comprising a structural iron member having a horizontal flange engaging the under surfaces of the floor members and a vertical flange depending from the inner edge thereof arranged to stiffen the horizontal flange to sustain the stresses thereon, and legs secured to the horizontal flanges in position to be braced against bending inwardly by the vertical flanges, said vertical flanges lying inside of the legs and serving as guides for the lifting truck to protect the legs when the lifting truck is introduced beneath the skid.

8. A portable skid, for use with a lifting truck, comprising a rigid floor made up of a number of transversely extending boards and longitudinally extending upper and lower rigid bars at each side of the floor, said bars being rigidly secured to the ends of the boards and to each other to form load sustaining trusses and being separate from each other and adjustable toward each other in assembling the skid to accommodate the thickness of the boards, and legs secured to said trusses to support the floor in elevated position.

9. A portable skid, for use with a lifting truck, consisting of a number of transverse boards, trusses connecting said boards at their ends to form a rigid floor, said trusses each consisting of an upper and a lower angle bar secured to the ends of the boards and to each other, said upper and lower angle bars being separate from each other and adjustable toward each other in assembling the skid to accommodate the thickness of the boards, the upper angle bar having a horizontal flange engaging the tops of the boards and a vertical flange engaging and protecting the ends of the boards and the lower angle bar having a horizontal flange engaging the lower faces of the boards and a depending vertical reenforcing flange, legs secured to the lower angles bars to support the skid, and bolts each passing through a leg, two angle bars and a board whereby the whole structure is connected by one set of bolts.

10. A portable skid, for use with a lifting truck, comprising a rigid floor and legs secured thereto, said floor being made up of a number of transversely extending boards and longitudinally extending structural iron members embracing the ends of said boards and engaging the upper and lower faces thereof, said structural iron members having depending flanges between which the legs are positioned.

In testimony whereof, I affix my signature at Cincinnati, Ohio, this 15th day of October 1920.

WILLIAM STUEBING, Jr.